United States Patent [19]

Hyatt et al.

[11] Patent Number: 6,057,438
[45] Date of Patent: *May 2, 2000

[54] PROCESS FOR THE CO-PRODUCTION OF DISSOLVING-GRADE PULP AND XYLAN

[75] Inventors: John Anthony Hyatt; Richard William Fengl; Kevin Joseph Edgar, all of Kingsport; Maria Teresa Alvarez-Wright, Johnson City, all of Tenn.

[73] Assignee: Eastman Chemical Company, Kingsport, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/942,500

[22] Filed: Oct. 2, 1997

Related U.S. Application Data

[60] Provisional application No. 60/032,791, Oct. 11, 1996.

[51] Int. Cl.$^7$ .............................. C08B 1/00; D21C 9/08; C12P 19/14
[52] U.S. Cl. .............................. 536/127; 162/55; 435/99; 536/128
[58] Field of Search .............................. 435/99; 536/123, 536/123.1, 124, 127, 128; 162/1, 70, 71, 55

[56] References Cited

U.S. PATENT DOCUMENTS

| | | | |
|---|---|---|---|
| 2,280,307 | 4/1942 | Diehm | 195/8 |
| 4,008,285 | 2/1977 | Melaja et al. | 260/635 |
| 4,008,356 | 2/1977 | Asano | 429/98 |
| 4,025,356 | 5/1977 | Nyman | 127/1 |
| 4,075,406 | 2/1978 | Melaja et al. | 536/1 |
| 4,087,316 | 5/1978 | Jividen et al. | 162/14 |
| 4,742,814 | 5/1988 | Sinner et al. | 127/37 |
| 4,923,565 | 5/1990 | Fuentes et al. | 162/72 |
| 5,081,027 | 1/1992 | Nishida et al. | 435/171 |
| 5,084,104 | 1/1992 | Heikkila | 127/46.2 |
| 5,116,746 | 5/1992 | Bernier et al. | 435/172.3 |
| 5,179,021 | 1/1993 | du Manoir et al. | 435/278 |
| 5,369,024 | 11/1994 | Jeffries et al. | 435/200 |
| 5,395,765 | 3/1995 | Dahlberg et al. | 435/277 |
| 5,407,827 | 4/1995 | C-Schenkel et al. | 435/278 |
| 5,437,992 | 8/1995 | Bodie et al. | 435/200 |
| 5,457,046 | 10/1995 | Woldike et al. | 435/209 |
| 5,582,681 | 12/1996 | Back et al. | 162/5 |
| 5,645,686 | 7/1997 | Troughton et al. | 162/65 |
| 5,658,765 | 8/1997 | Noguchi et al. | 435/99 |

FOREIGN PATENT DOCUMENTS

| | | |
|---|---|---|
| 386 888 | 9/1990 | European Pat. Off. . |
| 442 806 | 8/1991 | European Pat. Off. . |

OTHER PUBLICATIONS

Aumont et al. *Pulp & Paper Canada*, p. 72, Jan. 1996.
Capps, Clive. *World Paper*, vol. 220(7):42(2), Jul. 17, 1995.
Katkevich et al. *Khim. Drev. (Riga)*, No. 4:82–87.** Jul./Aug. 1978. Abstract only.

Lazareva et al. *Tr. Leningrad. Tekhnol. Inst. Tsellyul. Bumzh. Prom.*, No. 30:20–29**, 1973. Abstract only.

Wayman, The Bleaching of Pulp, Rapson, TAPPI, Monograph Series No. 27 (1963) Technical Association of the Pulp and Paper Industry, New York, N.Y., Chapter 5, pp. 67–103.

Hinck et al., Chapter VIII, Dissolving Pulp Manu., vol. 4, Sulfite Science & Technology of Pulp & Paper Manu., 3rd Ed., Ingruber, Kocurek & Wong ed., pp. 213–243.

Gernot Gamerith & Hans Strutzenberger, *Xylans and Xylanases*, J. Visser et al., ed., (1992), pp. 339–348.

Enzymatic Treatment of Pulps by Jeffries in Emerging Tech. for Materials & Chemicals from Biomass, Rowell et al eds.; Advances in Chemistry Series No. 476 (1992), pp. 322–327.

Christov and Prior, *Enzyme and Microbial Technology*, 18, 244–250 (1996).

Saake, Clark & Puls, *Holzforschung*, 49, pp. 60–68 (1995).

Christov & Prior, *Biotechnology Letters*, 13, pp. 1269–1274 (1993).

Pratima Bajpai and Pramod K. Bajpai, *TAPPI Journal*, 79 (4), 225–230 (1996).

S. H. Zeronian in "Cellulose Chemistry & Its Applications", Harwood, Chichester, 1985, ed., Nevell & Zeronian, Chapter 6, pp. 166ff.

Roger C. Petterson et al in "An Analysis of the Wood Sugar Assay Using HPLC: A Comparison with Paper Chromatography", J. Chromatogr. Sci. 22 (1984) 478–84.

K. Garleb et al., *J. Agric. Food Chrm.*, 37 (1989) 1287–93.

Private Communication entitled "Production of Dissolving Pulp From Wastepaper Using Enzymes" authored by L.S. Jackson, T.W. Joyce, and J.A. Heitman, Department of Wood and Paper Science, North Carolina State University and received by scientists employed by Eastman Chemical Company from North Carolina State University prior to Oct., 1996.

*Primary Examiner*—Howard C. Lee
*Attorney, Agent, or Firm*—Michael J. Blake; Harry J. Gwinnell

[57] ABSTRACT

Disclosed is a process for upgrading paper-grade wood pulp to dissolving grade pulp which is suitable for use in the preparation of viscose rayon, cellulose ethers and cellulose esters such as cellulose acetate. The process utilizes a sequence of caustic extraction, xylanase treatment and caustic extraction to remove most of the xylan, which may be recovered for use in the production of xylose, xylitol, and furans.

10 Claims, No Drawings

6,057,438

PROCESS FOR THE CO-PRODUCTION OF DISSOLVING-GRADE PULP AND XYLAN

This application claims the benefit of U.S. Provisional Application Ser. No. 60/032,791, filed Oct. 11, 1996.

This invention pertains to a novel process for co-producing dissolving-grade pulp and xylan from certain wood pulps. More specifically, this invention pertains to a process wherein paper-grade, hardwood, kraft or soda pulp is successively extracted with aqueous sodium hydroxide, treated with a xylanase enzyme and then aqueous sodium hydroxide. The dissolving-grade pulp obtained from the process is useful in the manufacture of viscose rayon, cellulose ethers and cellulose esters such as cellulose acetate, cellulose acetate propionate and cellulose acetate butyrate. The xylan recovered from the process extracts may be converted to xylose and then to xylitol, a sweetening agent, by known processes, or it may be converted to furfural or other derivatives.

The production of viscose rayon and cellulose esters such as cellulose acetate for use in the manufacture of either film or fiber requires a source of high quality cellulose feedstock. The use of cotton linters, the source of cellulose of highest purity, has been reduced in recent years in favor of the more plentiful and less expensive wood pulp which also is used in paper manufacture. Wood pulp, however, requires extensive purification before it is suitable for viscose or cellulose ester manufacture. The additional purification, which involves treatment with alkali to remove and destroy hemicelluloses and bleaching to remove and destroy lignin reduces the yield and increases the cost of "dissolving-grade" cellulose derived from wood pulp.

"Pulp" is an aggregation of random cellulosic fibers obtained from plant fibers. As used herein, the term "pulp" refers to the cellulosic raw material used in the production of paper, paperboard, fiberboard, and similar manufactured products. Pulp is obtained principally from wood which has been broken down by mechanical and/or chemical action into individual fibers. Pulp may be made from either hardwoods (angiosperms) or softwoods (conifers or gymnosperms). Hardwood and softwood pulps differ in both the amount and the chemical composition of the hemicelluloses which they contain. In hardwoods, the principal hemicellulose (25–35%) is glucuronoxylan while softwoods contain chiefly glucomannan (25–30%) (Douglas W. Reeve, *Pulp and Paper Manufacture*, Vol. 5, pp. 393–396).

There are three general types of chemical pulps:
(1) Soda pulp is produced by digesting wood chips at elevated temperatures with aqueous sodium hydroxide.
(2) Kraft pulp is produced by digesting wood chips at temperatures above about 120° C. with a solution of sodium hydroxide and sodium sulfide. Some kraft pulping is also done in which the sodium sulfide is augmented by oxygen or anthraquinone. Although kraft pulping removes most of the lignin originally present in the wood, enough remains that a bleaching step is required to give pulp of acceptable color. As compared with soda pulping, kraft pulping is particularly useful for pulping of softwoods, which contain a higher percentage of lignin than do hardwoods.
(3) Sulfite pulp is produced by digesting wood with sulfur dioxide and an alkali such as calcium, magnesium, or sodium hydroxide. The process operates in the presence of a good deal of free sulfur dioxide, at low pH. Although this process, like kraft pulping, separates most of the lignin from the cellulose fibers, considerable color remains.

"Dissolving-grade pulp" to which the present invention pertains is pulp that has been purified sufficiently for use in the production of viscose rayon, cellulose ethers, or cellulose esters with organic or inorganic acids. It may be produced from either kraft, soda, or sulfite pulp by bleaching and other treatments which will be discussed herein. Historically, dissolving grade pulp (in contrast to paper-grade pulp) referred to pulp which reacted with carbon disulfide to afford a solution of cellulose xanthate which then could be spun into fibers (viscose rayon) with evolution of carbon disulfide and regeneration of cellulose. Dissolving-grade pulp now refers to pulp which is used to manufacture various cellulose derivatives such as inorganic and organic esters, ether, rayon and the like.

"Bleaching" is the removal of color from pulp, primarily the removal of traces of lignin which remains bound to the fiber after the primary pulping operation. Bleaching usually involves treatment with oxidizing agents such as oxygen, peroxide, chlorine, or chlorine dioxide. Classically, the pulp is treated with chlorine, then extracted with caustic, and finally treated with hypochlorite. The alkaline extraction may be with either hot or cold caustic. The relative merits of extraction with cold, versus hot, caustic are discussed at length by M. Weyman in *The Bleaching of Pulp*, W. Howard Rapson, editor, *TAPPI Monograph series* No. 27 (1963), Technical Association of the Pulp and Paper Industry, New York, NY., Chapter 5, pp. 67–103. Weyman concludes that cold caustic extraction is the superior method for xylan removal from pulp.

While the chief purpose of the chlorine and caustic treatments is to render the residual lignin in the pulp soluble and extractable, the caustic also degrades and dissolves not only a substantial amount of the hemicellulose, but it also attacks the cellulose itself, with resulting decreases in degree of polymerization and pulp yield. The low molecular weight of some of the hemicellulose fragments makes them hard to isolate, while in some cases (prehydrolysis kraft), the harsh conditions convert the hemicelluloses to decomposition products. In conventional operation, therefore, no attempt is made to recover useful products from the hemicellulose. Chlorine bleaches lead to undesired impurities and make recycle of caustic very difficult. The use of chlorine as the bleaching agent also inevitably produces traces of extremely toxic chlorinated dioxins.

One measure of the effectiveness of bleaching is the brightness of the resulting pulp. Brightness is defined as the reflectivity of a pulp sample as compared to the reflectivity of a specified standard surface using blue light with a peak wavelength at 457 nm.

Hardwood pulp produced by the kraft process contains a significant amount of hemicelluloses, chiefly xylans. The xylans, in moderate amounts, are desirable in paper manufacture because they help maintain a random dispersion of fiber in the furnish, resulting in more uniform and mechanically stronger paper webs. However, in pulp used to produce cellulose esters and other cellulose derivatives, xylans contribute to color and haze in the final product and therefore pulp for this application normally must contain a very low level of xylan. Hardwood kraft pulp for paper manufacture generally contains about 80 to 84% cellulose, about 15 to 20% xylans, and about 0.3–3% mannans. In contrast, dissolving-grade pulp suitable for cellulose ester manufacture for fiber and film applications should contain about 97 to 98.5 weight percent cellulose, not more than about 3 weight percent, e.g., 0.5 to 3 weight percent, xylans, and not more than about 0.5 weight percent, e.g., 0.1 to 0.5 weight percent, mannans. This requirement for higher purity necessitates more drastic treatment with alkali, with resulting decrease in pulp yield. Since the hemicelluloses removed normally are not recoverable from such treatments, they are used, if at all, as fuel and have negligible value. The manufacture of dissolving pulps is discussed in detail by J. F. Hinck et al., Chapter VIII, Dissolving Pulp Manufacture in Volume 4, Sulfite Science & Technology of *Pulp and Paper Manufacture*, Third Edition. O. V. Ingruber, M. J. Kocurek, and A. Wong, ed., published by the Technical Section, Canadian Pulp and Paper Association Montreal, QC, Canada, pp. 213–243. Although the relative amounts of impurities vary somewhat between kraft and sulfite pulps, both contain significant amounts of lignin and hemicelluloses which must be reduced.

U.S. Pat. No. 4,008,285 (and related U.S. Pat. No. 4,075,406) contains a brief review of early attempts to produce xylose from natural products such as wood. The '285 patent also describes a process for purifying the pentosan-rich solution obtained by acid hydrolysis of xylan-containing raw material. The process involves first purifying the hydrolysate by ion exclusion and color removal, then subjecting the purified solution to chromatographic fractionation. The recovery of the pulp by-product is not disclosed.

U.S. Pat. No. 4,087,316 describes a process for removing cellulosic fibers from seed hulls, such as cottonseed, and for obtaining xylose by hydrolysis from the remaining hull fragments in the presence of dilute sulfuric acid. The resulting xylose hydrolysate may be hydrogenated to xylitol.

U.S. Pat. No. 4,742,814 discloses a process for obtaining xylitol and, optionally, cellulose and lignin from lignocellulose vegetable materials by treatment with a mixture of water and lower aliphatic alcohols and/or ketones at elevated temperature and pressure followed by separation of fibrous materials, organic solvents, and lignin from the treatment solutions. The oligosaccharides and polysaccharides remaining in solution from this process are hydrolyzed by dilute acid.

U.S. Pat. No. 5,084,104 is concerned with recovery of xylose from hydrolysates of such natural materials as birch wood, corn cobs, cotton seed hulls, etc. The disclosed process involves subjecting the hydrolysate to a chromatographic column comprising a strong anion exchange resin, and eluting a xylose-rich fraction. No reference is made to the recovery of any cellulose remaining after extraction of the xylose.

A more recent article (Gernot Gamerith and Hans Strutzenberger, *Xylans and Xylanases*, J. Visser et al., ed., (1992), pp. 339–348) discusses the recovery of xylan during viscose pulp purification. Suggested uses are as a raw material for such products as furfural, xylitol, xylose, etc. In the process disclosed, beech-wood pulp produced by magnesium bisulfite cooking is first bleached with alkaline peroxide and hypochlorite, which reduces the xylan content to about 3.6%. This pulp is then treated with "high concentrated" sodium hydroxide solution to reduce the xylan content sufficiently for the pulp to be used in viscose production. Xylan is recovered by acidification of the caustic solution. An unspecified amount of xylan remains in the final pulp which, apparently, is sufficiently pure for use in viscose rayon production. Although no pulp yields are given, the rather drastic alkali treatment suggests that the process resulted in a substantial loss of cellulose.

Bleaching is another step in pulp production. Conventional bleaching processes involving chlorine and alkali present environmental problems as mentioned above, as well as substantially reducing the amount of dissolving-grade pulp which can be recovered from the wood. Some work has been done to determine whether the xylans in wood pulp can be hydrolyzed and removed by the action of enzymes. Most prior work has been concerned merely with sufficient removal of xylan to free residual lignin which is bound to the fibers, and aid in pulp bleaching. A number of articles and reviews have been published which deal with this aspect of the use of enzymes in pulping. A review, Enzymatic Treatment of Pulps by Thomas W. Jeffries in *Emerging Technologies for Materials and Chemicals from Biomass*, Roger M. Rowell, Tor P. Schultz, and Ramani Narayan, eds.; *Advances in Chemistry Series* No. 476 (1992), pp 322–327 discusses pulp bleaching with hemicellulases. A recent article (L. P. Christov and B. A. Prior, *Enzyme and Microbial Technology*, 18, 244–250 (1996)) describes the use of repeated, alternating, treatments with the hemicellulases derived from the yeast, *Aureobasidium pullulans* and alkali to enhance bleaching of sulfite pulps.

The following U.S. patents disclose the use of enzymes as an aid in pulp bleaching. None of these patents discloses the production and/or recovery of chemical-grade, or dissolving-grade pulp, and none discusses the recovery of xylitol.

U.S. Pat. No. 5,457,046 discloses enzymes with xylanolytic activity.

U.S. Pat. No. 5,407,827 discloses pulp bleaching by means of delignification using thermostable xylanase.

U.S. Pat. No. 5,395,765 discloses a process for treating pulp with an enzyme to improve pulp bleachability and reduce the amount of chlorine used.

U.S. Pat. No. 5,369,024 discloses the use of xylanase for removing color from kraft wood pulps.

U.S. Pat. No. 5,179,021 discloses a pulp bleaching process comprising oxygen delignification and xylanase enzyme treatment.

U.S. Pat. No. 5,116,746 discloses that cellulase-free endoxylanase enzyme is useful in pulp delignification.

U.S. Pat. No. 5,081,027 discloses a method for producing pulp by a treatment using a microorganism and its related enzymes.

U.S. Pat. No. 2,280,307 discloses a process of manufacturing paper.

The mechanism by which hemicellulose-degrading enzymes (xylanases and mannanases) assist in color removal or brightening of wood pulp is not completely clear and may be complex (Saake, Clark, & Puls, *Holzforschung*, 49, pp 60–68 (1995)). Internal structural changes in the pulp fibers, in addition to surface modification by hydrolysis of reprecipitated xylan from the surface of kraft fibers and loosening of the bonds between the hemicelluloses and residual lignin may also be important.

Christov and Prior, *Biotechnology Letters* 13, pp 1269–1274 (1993) describe the preparation of dissolving pulp, in contrast to paper-grade pulp, by treating bleached sulfite (not kraft) pulp with xylanases, specifically enzymes of *Aureobasidium pullulans*. They state that even with high enzyme loadings and 24 hour incubation periods, xylan removal was limited. The use of xylanases in prebleaching of bamboo kraft pulp for paper manufacture recently has been reported (Pratima Bajpai and Pramod K. Bajpai, *TAPPI Journal* 79(4), 225–230 (1996).

Cellulose can exist in either of two distinctly different crystalline forms. Naturally occurring cellulose crystallites have a morphology known as cellulose I in which the individual cellulose molecules are arranged in a parallel, or head-to-head, fashion. The second cellulose crystalline morphological form is known as cellulose II. This form (which does not occur in nature) has the individual cellulose molecules aligned in an antiparallel, or head-to-tail, arrangement. Cellulose II is more stable than cellulose I. While cellulose I can be converted to cellulose II, the reversal of this process has never been achieved.

Cellulose II fibers are stronger than cellulose I fibers. The conversion of cellulose I to cellulose II is practiced commercially in the process known as mercerization, the "mercerized" cellulose being largely cellulose II. The conversion of cellulose I to cellulose II (mercerization) is carried out by exposing the native cellulose I to high concentrations of aqueous sodium hydroxide, typically about 15 weight percent sodium hydroxide or higher.

In the production of purified cellulose for use in cellulose ester production, it is important to avoid the formation of cellulose II because the rate of acylation of mercerized cellulose (cellulose II) is much slower than the rate of acylating native cellulose I. However, the formation of cellulose II is not objectionable if the dissolving-grade pulp comprising cellulose II is destined for use in the production of viscose rayon. For a discussion of this subject and for further references, see S. H. Zeronian in "Cellulose Chemistry and Its Applications", Ellis Harwood, Chichester, 1985, ed. T. Nevell and S. Zeronian, chapter 6, pages 166 ff. See especially references 27 and 28 for the reduced reactivity of cellulose II.

The present invention provides a process for the co-production of dissolving-grade pulp and xylan from certain wood pulps. The dissolving-grade pulp produced may be used in the manufacture of viscose rayon, cellulose ethers and cellulose esters whereas the xylan recovered from the process may be converted to xylose and then to xylitol. The process of the present invention provides a process for the co-production of dissolving-grade pulp and xylan by the steps comprising:

(1) intimately contacting with agitation a paper-grade, hardwood, kraft or soda pulp with aqueous sodium hydroxide solution at a temperature of about 50 to 100° C.;
(2) subjecting the slurry resulting from step (1) to liquid/solid separation and removing sodium hydroxide from the solid material separated;
(3) intimately contacting the solid material obtained from step 2 with an aqueous solution of a xylanase enzyme;
(4) subjecting the slurry resulting from step (3) to liquid/solid separation;
(5) intimately contacting with agitation the solid material obtained from step (4) with aqueous sodium hydroxide solution at a temperature of about 50 to 100° C.;
(6) subjecting the slurry resulting from step (5) to liquid/solid separation and removing sodium hydroxide from the solid material separated to obtain dissolving-grade pulp;
(7) recovering xylan from the xylan/sodium hydroxide solutions obtained from steps (2) and (6);

wherein the paper-grade pulp comprises about 75 to 84 weight percent cellulose, about 15 to 22 weight percent xylans, and about 0.3–3 weight percent mannans; and the dissolving-grade pulp comprises about 97 to 98.5 weight percent cellulose, about 0.5 to 3 weight percent xylans, and about 0.1 to 0.5 weight percent mannans.

Although our novel process is directed principally to the production of pulp which is suitable for use in the manufacture of cellulose esters, it also is suitable for the production of other grades of dissolving pulp. Cellulose acetate production requires an extremely pure dissolving-grade pulp which is very low in xylan content. Other dissolving-grade pulps, such as those used for the manufacture of cellulose nitrate or viscose rayon, while being of higher purity than paper-grade pulp, may contain a somewhat higher content of xylan, e.g., up to 7 weight percent xylan.

In the first step of the process, a paper-grade, hardwood, kraft or soda pulp is contacted or digested with aqueous sodium hydroxide solution at a temperature of about 50 to 100° C. To avoid cellulose II production, it is an important element of the present invention that the entire extraction/maceration constituting step (1) is performed at a temperature in the range of 50 to 100° C. The concentration of the sodium hydroxide in the aqueous sodium hydroxide solution normally is about 8 to 12 weight percent, with a concentration of about 9 to 10 weight percent being preferred. The amount of paper-grade pulp typically present in the pulp/aqueous sodium hydroxide slurry of step (1) is in the range of about 3 to 15, preferably about 7 to 10, weight percent based on the total weight of the slurry. A particularly unique feature of the present invention is the use of elevated temperatures, e.g., about 50 to 100° C. during the aqueous caustic treatment of step (1). It is preferred to carry out step (1) at a temperature of about 60 to 80° C. The time required for step (1) can vary substantially depending on various factors such as the particular pulp, sodium hydroxide concentration and temperature employed. Contact times of about 1 to 30 hours are typical for step (1) although contact times in the range of about 0.1 to 1 hour normally are adequate.

The second step of our novel process involves conventional liquid/solid separation wherein the solid material present in the step (1) mixture is separated, e.g., by filtration or centrifugation, from the step (1) liquid phase comprising a solution of sodium hydroxide, xylan and water. Residual sodium hydroxide present in the solid material is reduced or removed by washing the material with water. Normally, the material is washed, for example, either by washing the filter cake on the filter, by counter current washing or by reslurrying the solids collected in water, until the wash water has a pH of less than about 8, preferably a pH in the range of about 6 to 8. Step (2) preferably is carried out at a temperature of about 50 to 100° C., most preferably about 60 to 80° C. This preferred embodiment produces a dissolving-grade pulp which contains little, if any, cellulose II and, therefore, is especially useful for use in the manufacture of carboxylic acid esters of cellulose.

In step (3) of the process, the solid material collected in step (2) is contacted with a mixture of water and an effective amount of at least one xylanase enzyme. The xylanase enzymes suitable for use in the practice of our invention are those xylanase enzymes which are substantially free of cellulase activity, i. e., those which do not substantially degrade the cellulose content of the pulp and provide a cellulose having a Cuene IV of 4 or greater and which afford a cellulose product sufficiently low in xylan content for the particular end use. See, for example, the xylanase enzymes described in U.S. Pat. Nos. 5,369,024, 5,395,765 and 5,407,827 and the references disclosed in these patents. Suitable xylanases are available from a number of sources and exhibit a wide range of activities under a variety of operating conditions. The variability of enzymes and the optimum conditions at which they are effective is further discussed by Bajpai and Bajpai, TAPPI Journal 79(4), 225–230 (1996).

In general, the step (3) enzyme treatment is carried out at a temperature of between about 0 arid 80° C., preferably between 20 and 80° C., and most preferably between 30° C. and 70° C., at a pH between 2 and 12 for a time between 0.1 and 10 hour, preferably between 0.5 and 3 hours. The pH and temperature at which an enzyme exhibits maximum activity vary substantially and are highly specific for a given enzyme. The pH and temperature at which a given enzyme is most effective can be determined readily by those skilled in the art.

The amount of xylanase enzyme required to give satisfactory results depends upon the degree of xylan removal which is desired, the reaction conditions, and the particular enzyme used. Although xylanase assay typically is expressed by enzyme manufacturers as "units/mL", the units are measured differently by different manufacturers and, consequently, the "units/mL" assay is meaningful, if at all, only with respect to a specific enzyme supplied by a specific manufacturer. For a given enzyme type and source, the amount of enzyme to be used is that required to give the desired purity of dissolving grade pulp. The weight ratio of water to the step (2) solid material (dry basis) in step (3) may be about 2:1 to 1000:1, preferably about 4:1 to 35:1.

The fourth step of the process is a conventional liquid/solid separation wherein the solid pulp material present in the enzyme-treated mixture of step (3) is separated, e.g., by filtration or centrifugation, from the step (3) liquid phase comprising xylanase enzyme, water and xylan. Steps (5) and (6) are carried out according to the procedures described above relative to steps (1) and (2). As noted above, step (6) yields dissolving-grade pulp which comprises about 97 to 98.5 weight percent cellulose, 0.5 to 3 weight percent xylans, and about 0.1 to 0.5 weight percent mannans.

In step (7) xylan may be recovered from the liquids of steps (2) and/or (6) by known procedures. A preferred method for recovering the xylan comprises the alcohol precipitation procedure described in U.S. Pat. No. 3,935,022. In this method, one or more $C_1$–$C_4$ alkanols are combined with the liquids of steps (2) and/or (6) to precipitate the xylan from the liquids. Thus, step (7) preferably comprises combining the liquids of steps (2) and/or (6) with one or more $C_1$–$C_4$ alkanols to effect precipitation of xylan from the liquids and subjecting the resulting mixture to liquid/solid separation to recover xylan. The volume of the alkanol(s) combined with the liquids of steps (2) and/or (6) to effect xylan precipitation may be in the range of about 50 to 200% of the volume of the liquids of steps (2) and/or (6) although alkanol volumes of about 80 to 120% (same basis) are more typical. Methanol and ethanol are particularly preferred alkanols. The liquids of steps (2) and/or (6) may be concentrated, e.g., by vaporization or membrane separation procedures, prior to being combined with the alkanol(s).

The solution comprising sodium hydroxide, alkanol(s) and water obtained from the liquid/solid separation of step (7) may be subjected to distillation to separate the alkanol(s) from the aqueous sodium hydroxide. Thus, both the alkanol(s) and the aqueous sodium hydroxide may be used repeatedly in the process.

Alternatively, the liquids of steps (2) and/or (6) can be concentrated by removal of water by distillation or multiple-effect evaporation until the concentration of sodium hydroxide is about 40–50 weight percent. This concentrated solution can be treated with a $C_1$–$C_4$ alkanol to precipitate the xylan. About 1 volume equivalent of alkanol is required. The precipitated xylan is recovered by filtration, centrifugation, or the like, and the filtrate distilled to recover the alkanol and leave a concentrated sodium hydroxide solution which can be diluted to the desired concentration for use in the xylan extraction process.

In another variation, the liquids of steps (2) and/or (6) can be subjected to nanofiltration through a caustic-stable membrane which allows passage of water and sodium hydroxide but does not allow the passage of dissolved organic compounds having a molecular weight above a few hundred, e.g., xylan. This process variation produces a clean sodium hydroxide stream ready for re-use and a much smaller stream in which the xylan is highly concentrated in aqueous sodium hydroxide. The xylan in this organic-rich stream may be recovered by alkanol precipitation as described above, or by neutralization of the sodium hydroxide by the addition of a mineral acid which also precipitates the xylan.

The dissolving-grade wood pulp produced by the present invention is useful for conversion into viscose or cellulose ester fibers, plastics, etc. The utility of the dissolving-grade wood pulp in the manufacture of cellulose acetate has been demonstrated by preparing cellulose acetate from both paper-grade pulp and the dissolving-grade pulp produced by the process of this invention. The roll color of cellulose acetate produced from paper grade pulp was 18.2–18.3 whereas the roll color of cellulose acetate prepared from the dissolving pulp produced in accordance with the present invention typically is between 11.4 and 11.9. commercially prepared cellulose acetate has an average roll color of 11.7.

The xylan recovered in step (7) of the process may be converted to xylose and xylitol according to conventional procedures. Procedures for the conversion of xylan to xylose and xylitol, and recovery processes, are described in U.S. Pat. Nos. 4,008,356, 4,025,356, 4,075,406 and 5,084,104. For example, heating a slurry of xylan in water, e.g., a slurry containing from about 5 to 25 weight percent solids, in the presence of a mineral acid produces xylose. The heating normally is at a temperature in the range of about 70 to 150° C., preferably at about 90 to 100° C. Examples of suitable mineral acids include sulfuric acid, hydrochloric acid and phosphoric acid. Alternatively, the recovered xylan may be converted to the industrial intermediate furfural. It is possible to utilize the xylan present in the xylan/sodium hydroxide solutions obtained from steps (2) and/or (6) in the production of xylose from xylan.

The process of the present invention is further illustrated by the following examples. Since they are too insoluble for direct analysis, the hemicelluloses (xylan and mannan) in pulp were determined by digestion with dilute acid followed by analysis of the hydrolysate for the resulting sugars (xylose and mannose) by liquid chromatography. See, for example, the procedures described by R. Petersen, et al., J. Chromatogr. Sci., 22 (1984) 478–84) and K. Garleb, et al., J. Agric. Food Chrm., 37 (1989) 1287–93. "Cuene IV", a measure (in deciliters per gram—dL/g) of the degree of polymerization of cellulose, was determined according to TAPPI procedure T230 om-89 (Revised, 1989). In this procedure, the viscosity of a solution of cellulose in a copper-ethylenediamine reagent is measured as an indicator of the molecular weight of the sample.

EXAMPLES 1–7 AND COMPARATIVE EXAMPLES 1–4 (C-1 to C-4)

These examples illustrate of treatment of aspen paper-grade kraft pulp with 10 weight percent aqueous sodium hydroxide and relatively low levels of a xylanase enzyme available under the name Irgazyme 10A-X4 (4400 units of enzyme per mL, Genencor International, Inc.) The paper-grade pulp had a Cuene IV of 7.97 deciliters per cram and contained 17.80 weight percent xylose and 0.33 weight percent mannose.

The paper-grade pulp (10 g) was shredded into approximately 1 inch×3 inch (2.54 cm×7.62 cm) pieces and mixed with 200 mL of a 10 weight percent solution of sodium hydroxide in deionized water. The pulp and caustic were mixed thoroughly and shaken at different temperatures for different periods of time. The pulp was then transferred to a porous cloth bag and washed under running deionized water for 1 hour.

The bag containing the pulp was squeezed to remove excess water, then the pulp was added to 200 mL of deionized water, the pH of which had been adjusted to pH 4.5 by addition of sodium acetate if required, and which contained the enzyme. This slurry was mixed well, and placed in a constant temperature shaker bath at 30° C. for 1 hour. The mixture was transferred to a wash bag and washed as before for 1 hour.

The solid material resulting from the enzyme treatment was treated with aqueous sodium hydroxide and washed using the same sodium hydroxide concentration, treatment time and temperature used in the first agueous sodium hydroxide treatment. After the second aqueous sodium hydroxide treatment and wash, the pulp was removed from the wash bag and placed in a temperature controlled oven overnight or until dry. Samples of the dissolving-grade pulp thus obtained were analyzed for Cuene IV and for sugars by acidic digestion to monomers followed by liquid chromatography. The conditions used in the aqueous sodium hydroxide extractions and the results achieved are shown in Table I wherein "Time" is the period of time (minutes) and "Temp" is the temperature (0° C.) of each aqueous sodium hydroxide treatment; "Enzyme Conc" is the units of xylanase enzyme present during the enzyme treatment per g of paper-grade pulp used initially; "Cuene IV" is given in dL/g and has the meaning given above; and the values given under "Xylose" and "Mannose" are the weight percentages of xylose and mannose, respectively, present in the dissolving grade pulp obtained in each example. The comparative examples are characterized as C-1, C-2, etc.

The results set forth in Table I clearly show that the sequential caustic/enzyme/caustic treatments are effective to purify paper-grade pulp and convert it to dissolving-grade pulp and that the caustic treatments at 70° C. are more effective than 30° C.

TABLE I

| Example | Time Min. | Temp ° C. | Enzyme Conc u/g pulp | Cuene IV dL/g | Xylose % | Mannose % |
| --- | --- | --- | --- | --- | --- | --- |
| C-1 | 30 | 30 | 20 | 7.92 | 2.68 | 0.67 |
| C-2 | 60 | 30 | 20 | 7.55 | 2.60 | 0.72 |
| C-3 | 60 | 30 | 60 | 6.14 | 2.40 | 0.65 |
| C-4 | 30 | 30 | 60 | 6.52 | 2.73 | 0.62 |
| 1 | 60 | 70 | 60 | 5.93 | 1.85 | 0.75 |
| 2 | 45 | 50 | 40 | 6.95 | 2.15 | 0.70 |
| 3 | 30 | 70 | 20 | 7.21 | 2.32 | 0.68 |
| 4 | 45 | 50 | 40 | 6.33 | 2.30 | 0.63 |
| 5 | 30 | 70 | 60 | 6.46 | 2.23 | 0.66 |
| 6 | 60 | 70 | 20 | 6.22 | 2.13 | 0.68 |
| 7 | 45 | 50 | 40 | 6.63 | 2.57 | 0.62 |

EXAMPLES 8 AND 9 AND COMPARATIVE EXAMPLES 5 AND 6

The general procedure described in Examples 1–7 was repeated for Examples 8–11 and Comparative Examples 5–8 using the same paper-grade pulp. The enzyme concentration used in the xylanase enzyme treatment step was 40 units of Irgazyme 10A-X9 xylanase enzyme per g of paper-grade pulp used initially in each example. The enzyme treatment step was carried out at pH 4.5 and 30° C. The consistency used in these examples was 4.76 wherein "consistency" refers to the g of paper-grade pulp initially used per g reaction mixture, expressed as a percentage, during the enzyme treatment step. The conditions used in the aqueous sodium hydroxide extractions and the results achieved are shown in Table II wherein "Time", "Temp", "Cuene IV", "Xylose" and "Mannose" have the meanings given above for Table I. Since the pulp lost some weight as soluble xylan and since it was charged as a wet solid without compensating for the diluting effect of the water, the actual sodium hydroxide concentration and consistency were somewhat lower in the second sodium hydroxide extraction than in the first.

TABLE II

| Example | Time Min. | Temp ° C. | Cuene IV dL/g | Xylose % | Mannose % |
| --- | --- | --- | --- | --- | --- |
| C-5 | 30 | 30 | 7.66 | 5.31 | 0.70 |
| 8 | 30 | 70 | 7.51 | 2.00 | 0.47 |
| C-6 | 60 | 30 | 8.15 | 2.98 | 0.50 |
| 9 | 60 | 70 | 7.61 | 1.73 | 0.76 |

The data presented in Table II clearly show that the lowest xylose content is reached when the caustic treatments are carried out at 70° C. for 60 minutes. Although Comparative Example C-6 shows that a caustic extraction temperature of 30° C. can produce a pulp having less than 3 weight percent xylan, in all cases the use of 70° C. gives superior results when other variables are the same. We have found that, in general, higher concentrations of sodium hydroxide give better results with a concentration of about 10 weight percent being the best because higher concentrations will cause mercerization, even at high temperatures.

EXAMPLES 10 AND 11 AND COMPARATIVE EXAMPLES 7–12

Examples 10 and 11 and Comparative Examples 7–12 show the effect of varying the sequence of the aqueous sodium hydroxide treatments (designated "E") and the xylanase enzyme treatment(s) (designated "X") on the xylan content of treated pulp using two different enzymes: Irgazyme 40-X4 xylanase in Examples 10 and Comparative Examples 7–9 and Buzyme xylanase (available from Buckman Laboratories) in Example 11 and Comparative Examples 10–12. In these examples, each aqueous sodium hydroxide treatment was carried out at 70° C. with 10 weight percent aqueous sodium hydroxide using the general procedure and the paper-grade pulp described in Examples 1–7. In Examples 10 and Comparative Examples 7–9 the concentration of the enzyme was 20 units of xylanase enzyme per g of pulp, the pH of the enzyme step was 6.5 and the temperature of the enzyme step was 30° C. In Example 11 and Comparative Examples 10–12 the concentration of the enzyme was 60 units of xylanase enzyme per g of pulp, the pH of the enzyme step was 7.0 and the temperature of the enzyme step was 70° C. The sequence of treatments used and the results achieved in each example are shown in Table III wherein the letters set forth below "Treatment Sequence" identify the order (proceeding from left to right) of the treatments carried out in each example and "Cuene IV", "Xylose" and "Mannose" have the meanings given above for Table I. The values given for "Weight Yield" are determined by:

$$\% \text{ Yield} = \frac{\text{Dry Weight of Treated Pulp}}{\text{Dry Weight of Paper-Grade Pulp}} \times 100$$

TABLE III

| Example | Treatment Sequence | Cuene IV dL/g | Xylose % | Mannose % | Weight Yield % |
|---|---|---|---|---|---|
| C-7 | X-E-E | 7.45 | 2.52 | 0.61 | 76 |
| C-8 | X-E-X | 6.61 | 3.14 | 0.68 | 77 |
| 10 | E-X-E | 7.67 | 1.63 | 0.81 | 75 |
| C-9 | E-E-X | 5.76 | 2.21 | 0.69 | 75 |
| C-10 | X-E-E | 6.34 | 2.35 | 0.69 | 75 |
| C-11 | X-E-X | 7.43 | 3.01 | 0.72 | 77 |
| 11 | E-X-E | 7.98 | 1.28 | 0.70 | 75 |
| C-12 | E-E-X | 6.91 | 1.99 | 0.68 | 76 |

EXAMPLES 12–15 AND COMPARATIVE EXAMPLES 13–18

The general procedure described in Examples 1–7 was repeated for Examples 12–15 and Comparative Examples 13–18 using a eucalyptus, kraft, paper-grade pulp having a Cuene IV of 6.09, a xylose content of 14.49 weight percent and a mannose content of 0.55 weight percent. The xylanase enzyme (Irgazyme 40-X4) treatment was carried out at pH 6.5 using a sodium acetate/acetic acid buffer, at 30° C. for 60 minutes. The enzyme concentration used in the enzyme treatment step was varied from 0 to 50 units of xylanase enzyme per g of paper-grade pulp used initially. In the examples in which no enzyme was used, the pulp was treated with an aqueous buffer solution at pH 6.5 for 30° C. for 60 minutes. Each aqueous sodium hydroxide extraction was carried out for 60 minutes using 10 weight percent aqueous sodium hydroxide solution and the temperatures shown in Table IV. The temperatures used in the first and second aqueous sodium hydroxide extractions ("First Caustic" and "Second Caustic") and the results achieved are shown in Table IV wherein "Enzyme Conc", "Cuene IV", "Xylose" and "Mannose" have the meanings given above for Table I.

TABLE IV

| Example | First Caustic ° C. | Second Caustic ° C. | Enzyme Conc u/g | Cuene IV dL/g | Xylose % | Mannose % |
|---|---|---|---|---|---|---|
| C-13 | 30 | 30 | 0 | 6.30 | 5.09 | 0.38 |
| C-14 | 70 | 30 | 0 | 6.53 | 3.34 | 0.33 |
| 12 | 70 | 70 | 50 | 4.89 | 2.26 | 0.39 |
| 13 | 50 | 50 | 25 | 5.06 | 2.56 | 0.34 |
| C-15 | 70 | 30 | 50 | 5.72 | 2.33 | 0.32 |
| C-16 | 30 | 70 | 0 | 4.95 | 3.64 | 0.26 |
| 14 | 50 | 50 | 25 | 5.95 | 2.74 | 0.33 |
| C-17 | 30 | 70 | 50 | 5.69 | 2.96 | 0.25 |
| C-18 | 70 | 70 | 0 | s.49 | 3.19 | 0.36 |
| 15 | 50 | 50 | 25 | 5.38 | 2.73 | 0.27 |

The data presented in Table IV show that hot (70° C.) caustic extraction is more effective than caustic extractions at 30° C. and that there is no advantage in doing one extraction cold and the other hot. They also demonstrate that results are much poorer when the enzyme treatment is omitted.

EXAMPLE 16

Aspen kraft pulp (20 g) similar to that used in Example 1 was preheated to about 70° C. To the pulp was added a volume of 10 weight percent aqueous sodium hydroxide, preheated to 70° C., sufficient to give a suspension of 7 weight percent pulp in the aqueous sodium hydroxide. This mixture was maintained at 70° C. for 1 hour, filtered hot, (200 ml of filtrate was recovered and set aside for xylan recovery) and the pulp washed with 70° C. water until the filtrate was pH 7. The pulp then was diluted to 7 weight percent concentration with distilled water and 0.166 ml of a commercial xylanase (6000 units/ml) was added to the slurry. This mixture was maintained at 70° C. for 1 hour. The pulp again was separated by filtration and combined with sufficient 10 weight percent aqueous sodium hydroxide to give A 7 weight percent pulp suspension. After 1 hour at 70° C., the pulp was filtered hot, washed with 70° C. water until the filtrate was neutral, and then dried in a 45° C. forced-air oven. The dried pulp weighed 16. 1 g and contained 2.53 weight percent xylose and no detectable cellulose II as determined by x-ray diffraction analysis.

The 200 mL of the xylan-containing, aqueous sodium hydroxide filtrate obtained above was stripped to approximately 100 mL and combined with 100 mL methanol to precipitate the xylan which was collected by filtration. The solid xylan was washed with water and ethanol, and then dried to give 2.1 grams of xylan product.

When the above procedure is repeated with the exception that the pulp is treated with 10 weight. percent aqueous sodium hydroxide solution at ambient temperature (about 25° C.) for about 5 minutes, then heated to 70° C. on a steam bath for 1 hour, the pulp obtained has a similar xylose and mannose content, but x-ray diffraction analyses shows the presence of from 30 to 70 mole percent cellulose II.

EXAMPLE 17

This example illustrates the utility of xylan as an intermediate for the preparation of the industrial intermediate, furfural. To a flask was charged 100 g water-wet (15% solids) xylan isolated from paper-grade aspen pulp according to the process of the invention and one 100 mL portion of a 1:1 mixture of concentrated hydrochloric acid and water. The mixture was stirred under reflux until solution of the solids had occurred; then distillation was commenced. There was obtained a distillate which separated into an upper water-rich phase and a lower organic phase. The organic phase was separated and shown to consist of essentially pure furfural by gas chromatographic comparison with an authentic sample.

EXAMPLE 18

This example illustrates the utility of xylan as an intermediate for the preparation of xylose. A mixture of 50 g of water wet xylan (equivalent to 7.75 g dry xylan) isolated from paper-grade aspen pulp according to the process of the invention was mixed with 100 mL water and 3 mL sulfuric acid. After being stirred overnight at reflux, the initial slurry became a dark solution. The mix was cooled, neutralized by addition of sodium acetate, treated with a small amount of decolorizing charcoal, filtered, and freeze-dried to give 12 g of crude product comprising xylose, sodium sulfate and sodium acetate. Analysis by high pressure liquid chromatography indicated the presence of 51.7 weight percent xylose (70.4% of theory) and 0.6% xylobiose.

The invention has been described in detail with particular reference to preferred embodiments thereof, but it will be understood that variations and modifications can be effected within the spirit arid scope of the invention.

We claim:

1. Process for the co-production of dissolving-grade pulp and xylan by the steps comprising:
   (1) intimately contacting a paper-grade, hardwood, kraft or soda pulp with aqueous sodium hydroxide solution at a temperature of about 50 to 100° C.;

(2) subjecting the slurry resulting from step (1) to liquid/solid separation and removing sodium hydroxide from the solid material separated;

(3) intimately contacting the solid material obtained from step 2 with a solution of a xylanase enzyme;

(4) subjecting the slurry resulting from step (3) to liquid/solid separation;

(5) intimately contacting the solid material obtained from step (4) with aqueous sodium hydroxide solution at a temperature of about 50 to 100° C.;

(6) subjecting the slurry resulting from step (5) to liquid/solid separation and removing sodium hydroxide from the solid material separated to obtain dissolving-grade pulp; and (7) combining the liquids of steps (2) and/or (6) with one or more $C_1$–$C_4$ alkanols to effect precipitation of xylan from the liquids and subjecting the resulting mixture to liquid/solid separation to recover xylan.

wherein the paper-grade pulp comprises about 75 to 84 weight percent cellulose, about 15 to 22 weight percent xylans, and about 0.3–3 weight percent mannans; and the dissolving-grade pulp comprises about 97 to 98.5 weight percent cellulose, 0.5 to 3 weight percent xylans, and about 0.1 to 0.5 weight percent mannans.

2. Process according to claim 1 wherein steps (1) and (5) are carried out using aqueous sodium hydroxide solution having a sodium hydroxide concentration of about 8 to 12 weight percent and a temperature in the range of about 50 to 100° C. is maintained throughout steps (1), (2), (5) and (6).

3. Process according to claim 1 wherein steps (1) and (5) are carried out at a temperature in the range of about 60 to 80° C. using aqueous sodium hydroxide solution having a sodium hydroxide concentration of about 9 to 10 weight percent.

4. Process according to claim 1 wherein a temperature in the range of about 60 to 80° C. is maintained throughout steps (1), (2), (5) and (6).

5. Process according to claim 1 wherein the $C_1$–$C_4$ alkanols are selected from methanol and ethanol.

6. Process according to claim 1 wherein the xylan recovered in step (7) is contacted with a mineral acid in the presence of water to convert at least some of the xylan to xylose.

7. Process according to claim 1 wherein the xylan recovered in step (7) is contacted with a mineral acid selected from sulfuric, hydrochloric and phosphoric acids in the presence of water at a temperature of about 70 to 150° C. to convert at least some of the xylan to xylose.

8. Process for the co-production of dissolving-grade pulp and xylan by the steps comprising:

(1) intimately contacting with agitation a paper-grade, hardwood, kraft or soda pulp with aqueous sodium hydroxide solution having a sodium hydroxide concentration of about 8 to 12 weight percent at a temperature of about 60 to 80° C.;

(2) subjecting the slurry resulting from step (1) to liquid/solid separation and removing sodium hydroxide from the solid material separated;

(3) intimately contacting the solid material obtained from step 2 with a solution of a xylanase enzyme;

(4) subjecting the slurry resulting from step (3) to liquid/solid separation;

(5) intimately contacting with agitation the solid material obtained from step (4) with aqueous sodium hydroxide solution having a sodium hydroxide concentration of about 8 to 12 weight percent at a temperature of about 60 to 80° C.;

(6) subjecting the slurry resulting from step (5) to liquid/solid separation and removing sodium hydroxide from the solid material separated to obtain dissolving-grade pulp;

(7) combining the liquids of steps (2) and/or (6) with methanol, ethanol or a mixture thereof to effect precipitation of xylan from the liquids and subjecting the resulting mixture to liquid/solid separation to recover xylan;

wherein the paper-grade pulp comprises about 75 to 84 weight percent cellulose, about 15 to 22 weight percent xylans, and about 0.3–3 weight percent mannans; the dissolving-grade pulp comprises about 97 to 98.5 weight percent cellulose, 0.5 to 3 weight percent xylans, and about 0.1 to 0.5 weight percent mannans; and a temperature in the range of about 60 to 80° C. is maintained throughout steps (1), (2), (5) and (6).

9. Process for the co-production of dissolving-grade pulp and xylose by the steps comprising:

(1) intimately contacting a paper-grade, hardwood, kraft or soda pulp with aqueous sodium hydroxide solution at a temperature of about 50 to 100° C.;

(2) subjecting the slurry resulting from step (1) to liquid/solid separation and removing sodium hydroxide from the solid material separated;

(3) intimately contacting the solid material obtained from step 2 with a solution of a xylanase enzyme;

(4) subjecting the slurry resulting from step (3) to liquid/solid separation;

(5) intimately contacting the solid material obtained from step (4) with aqueous sodium hydroxide solution at a temperature of about 50 to 100° C;

(6) subjecting the slurry resulting from step (5) to liquid/solid separation and removing sodium hydroxide from the solid material separated to obtain dissolving-grade pulp; and (7) contacting the xylan/sodium hydroxide solutions obtained from steps (2) and (6) with a mineral acid at a temperature of about 70 to 150° C. to convert at least a portion of the xylan to xylose;

wherein the paper-grade pulp comprises about 75 to 84 weight percent cellulose, about 15 to 22 weight percent xylans, and about 0.3–3 weight percent mannans; and the dissolving-grade pulp comprises about 97 to 98.5 weight percent cellulose, 0.5 to 3 weight percent xylans, and about 0.1 to 0.5 weight percent mannans.

10. Process according to claim 9 wherein step (7) is carried out at a temperature of about 90 to 100° C. using a mineral acid selected from sulfuric, hydrochloric and phosphoric acids.

* * * * *